United States Patent [19]
Winston et al.

[11] Patent Number: 5,149,938
[45] Date of Patent: Sep. 22, 1992

[54] METHODS FOR PRODUCING INDICIA ON DIAMONDS

[75] Inventors: Ronald H. Winston, Scarsdale; Necip Alev, New York, both of N.Y.

[73] Assignee: Harry Winston, S.A., Geneva, Switzerland

[21] Appl. No.: 595,861

[22] Filed: Oct. 11, 1990

[51] Int. Cl.$^5$ ............................................. B23K 26/00
[52] U.S. Cl. .......................... 219/121.69; 219/121.68; 219/121.73
[58] Field of Search ...................... 219/121.68, 121.69, 219/121.73, 121.75; 125/30.01

[56] References Cited

U.S. PATENT DOCUMENTS 3,527,198  9/1970  Takaska ................................. 125/30
4,401,876  8/1983  Cooper ........................... 219/121.69

Primary Examiner—C. L. Albritton
Attorney, Agent, or Firm—Darby & Darby

[57] ABSTRACT

A method of producing a marking on a diamond. For producing the marking, the region on the surface of the diamond which is to be marked is irradiated with an argon fluorine excimer laser whose output beam is passed through a mask which defines the marking. The diamond selectively absorbs the excimer laser radiation and undergoes a partial allotropic transformation without losing its diamond crystal lattice configuration.

21 Claims, 1 Drawing Sheet

METHODS FOR PRODUCING INDICIA ON DIAMONDS

BACKGROUND OF THE INVENTION a. Field of the Invention

This invention relates to the creation of identification marks of other visible or invisible (but detectable) indicia on diamonds, for the purposes of quality control, consumer brand identification, security or any other purpose requiring identification of a stone.

b. Description of the Pertinent Technical Art

Luxury and consumer goods alike are most often provided with an identifying mark from which the source of the goods can be identified. This is especially important in the case of a product whose quality and value can only be determined by specially skilled workers. Such identifying marks must be on the goods in a permanent form. On the other hand, the indicia should not impair the value of the goods in any way.

In the case of precious stones such as diamonds, there has long been a need for a reliable method by which the identity of a stone could be uniquely determined. Such a method would aid in locating and recovering specific pieces of lost or stolen jewelry. Furthermore, where diamonds are loaned on a temporary basis, as is not uncommon, permanent indicia on the stone would facilitate ensuring that the returned stone is identically the same as the loaned stone.

In addition, such detection systems or indicia could serve to indicate the level of quality or craftsmanship of the faceting, cutting and polishing of the stone. In essence, a permanent mark or detectible indicium on a diamond may serve as a hallmark or trademark in much the usual fashion, i.e., as an identification of source. Such a mark may be employed in dispelling the common misunderstanding that diamonds are essentially fungible, for any given weight, color and clarity. In fact, the quality of the gemstone may be markedly affected by the skill and care of the stoneworker in the selection, sawing, girdling, cutting and polishing processes.

There have been devised a number of processes for marking diamonds, such as are disclosed in U.S. Pat. Nos. 4,467,172 and 4,392,476, which entire disclosures are incorporated herein by reference. In each of these patents, lasers are disclosed for creating focussed spots of laser energy on or in the diamond to be marked, wherein the desired indicia are formed by creating series or patterns of dots with such focussed spots of energy.

The aforementioned laser marking systems employ YAG or Nd:YAG lasers operating at 1.06 microns wavelength, alone or in conjunction with frequency doublers. Thus the disclosed laser radiation incident on the diamond is at either 1.06 or 0.532 micron wavelength. As recognized in U.S. Pat. No. 4,467,172, laser energy at 0.532 microns wavelength can penetrate the surface of a diamond and can heat and vaporize portions of material below, as well as at, the diamond surface. This penetration of energy is undesirable and poses undue risks of fracturing the stone as a result of internal heating of the crystal structure. The prior art systems thus include complex arrangements to precisely control the amount of laser energy delivered so as to prevent damage to the diamonds being thus marked.

In addition, because diamond is substantially transparent or transmissive at the aforementioned wavelengths, such prior diamond marking processes generally involve the application of energy absorbing coatings such as carbon black to the surface to be marked, further complicating the procedure.

Moreover, since the indicia are formed by multiple spots, complex and expensive computer-driven X-Y tables are provided in the aforementioned prior art systems for accurately positioning the diamond with respect to the focussed spot of laser energy to be next applied. The need to create numerous spots to form a single mark further causes the prior art marking processes to be relatively slow in operation.

SUMMARY OF THE INVENTION

Accordingly, it is an object of the invention to provide an improved method for producing an identifying mark on a diamond. It is a more specific object of the invention to provide such a method which permits relatively rapid marking of diamonds without the need for expensive computer-driven X-Y tables.

It is a further object of the invention to provide a method of marking a diamond which entails a significantly reduced risk of damaging the stone.

Another object is to apply photolithograhic techniques to a diamond marking process so as to obtain markings of varying gray shades, rather than black-and-white only.

Another object of the invention is to provide a simple process for providing a "branded" diamond whose source, and thus quality of workmanship, could be relatively easily determined upon inspection.

Yet another object is to provide on diamonds identifying marks of superior line definition than is presently possible with current processes.

It is still another object of the invention to provide more complex arrangements for providing visible or invisible indicia on a diamond for security purposes.

One method according to the invention involves marking a diamond with a pulsed excimer laser.

Excimer lasers are pulsed gas-discharge lasers. In these lasers, a gas mixture (for example, argon and fluorine) is energetically charged and, upon sufficient charging, is caused to produce an intense emission of pulsed laser energy. Excimer lasers are conventionally used to produce a pulse or a plurality of pulses at wavelengths ranging from approximately 193 nano-meters (nm), or 0.193 microns, to about 351 nm, depending on the particular rare-gas-halide excimer produced.

Argon fluorine excimers produce laser energy at 193 nm. For radiation at this wavelength, the depth of penetration into pure diamond is very minimal. While diamond is highly energy transmissive across a broad wavelength spectrum, pure diamond has particularly low transmissivity, low reflectivity and high absorption at about 193 nm, which corresponds to nearly the cutoff frequency of the crystal. For this reason, the excimer laser energy is taken up in a particularly thin surface layer which is rapidly brought to a high temperature. A thin layer of material in the range of from several angstroms to several microns is in this way vaporized from the surface by each pulse, or alternatively may be partially graphitized by each pulse of the excimer laser. Vaporization of material serves to protect the stone from overheating because of the high energy of sublimation for diamond carbon.

It is known by those skilled in the art that diamonds are rarely "pure" crystals. Instead, impurities in the form of nitrogen atoms substituted into the crystal structure exist in almost every stone. The cutoff frequency of a given diamond increases with increasing presence of nitrogen impurities, and may range as high as 300 nm. Therefore, while the preferred embodiment is described in terms of use of an ArF excimer laser, other lasers may be suitably employed, wherein laser energy having wavelengths ranging from under 200 nm to about 300 nm can be provided. These include, in the ultraviolet range, krypton fluorine excimers (248 nm), xenon chlorine excimers (308 nm), and xenon fluorine excimers (351 nm). The most effective laser wavelength for a given stone will always depend on the purity of that diamond.

Thus, it will be understood the "about 193 nm" as used herein is meant to embrace a range sufficient to include the cutoff frequency of any given stone, i.e., from about 190 nm to about 350 nm.

It is especially advantageous to irradiate the diamond through a mask which contains a form of the mark or indicium as a cutout or other area of high transmissivity. Such masks can be mounted on or in front of the diamond. The spacing of the mask from the diamond surface is not critical because of the parallel radiation beam produced by an excimer laser, unless reduction optics are also employed, in which case the position of the mask is necessarily important. Masks may also be fabricated with areas having different transmissivities to laser energy at the desired wavelength, yielding marks with areas of differentiated contrast selected from a generated gray scale.

It is still more advantageous to image the mask on a surface of the diamond through optical means which passes ultraviolet radiation, e.g., sapphire or fused quartz or fused silica. If the image to be produced is first reduced, a high energy density is obtained on the surface of the diamond and therefore a lesser number of pulses or a reduced output capacity of the laser is required.

An arrangement similar to the foregoing briefly described embodiment, but instead for producing an indicium or trademark on glass spectacle lenses, is disclosed in U.S. Pat. No. 4,912,298, entitled "Method For Producing A Marking On A Spectacle Lens," the entire disclosure of which is hereby incorporated by reference.

A method according to another embodiment of the invention involves the use of an excimer laser to infuse various detectable substances into the surface of a diamond. Where a diamond is to be marked with indicia which are invisible to the naked eye, i.e., primarily for security purposes, it is obviously more difficult to subsequently locate the mark for identity verification. Excimer laser energy can be used to "force" or infuse certain materials, such as fluorescent dyes and other inorganic compounds which fluoresce in the ultraviolet range, into the surface of the diamond crystal structure. A mark created on a diamond which has first been coated with such a dye or material will fluoresce under appropriate lighting conditions, thus making it easier to locate the mark which would otherwise ordinarily be invisible to the naked eye.

Alternatively, other detectable materials such as conductive or magnetic substances may also be so deposited on or into the diamond, for subsequent detection.

BRIEF DESCRIPTION OF THE DRAWINGS

The invention will now be described with reference to the accompanying drawings wherein.

DESCRIPTION OF THE PREFERRED EMBODIMENTS OF THE INVENTION

Figure 1:
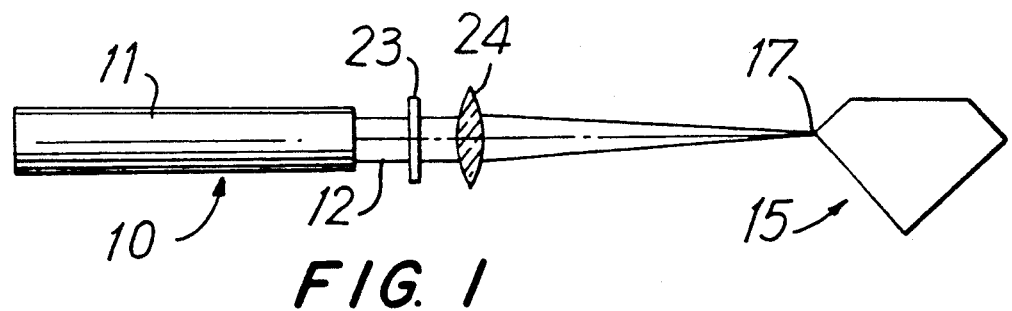
FIG. 1 is a partially schematic perspective view of an arrangement for creating indicia on a diamond with an excimer laser.

FIG. 1 generally illustrates an arrangement 10 for providing indicia on a diamond 15. A conventional argon fluorine excimer laser 11 provides pulsed laser energy for use in the methods of the invention. Such excimer lasers are commonly available from a number of commercial sources. One such supplier is Lambda Physik Inc., a West German company having offices in Acton, Mass., which sells such lasers under the designations "LPX 100" and "LPX 200" Series. Another such supplier is Questek, Inc. of Chatsworth, Calif. which markets an excimer laser under the designation "Model 2720."

The argon fluorine excimer laser 11 produces a laser output 12 at 193 nm wavelength having a flat-top beam profile (in horizontal cross-section) which propagates in a parallel beam path, when such laser 11 is provided with appropriate conventional resonator optics as is known. The output beam 12 is directed to pass through a mask 23 in order to produce a beam configured to produce a specific mark, as opposed to the conventional excimer beam of generally rectangular cross section. A portion of the laser radiation is stopped by the mask 23 and only in those regions which correspond to the form of the desired mark is the radiation of the laser allowed to pass through the mask.

After passing through the mask 23, more details of which will be described later, the beam is directed to reduction optics 24, which may be a 10:1 reduction lens suitable for use with laser energy at 193 nm, such as a lens fabricated of fused silica or sapphire. Surface lenses of any other desired demagnification value, such as 30:1, may be used as appropriate.

The reduction lens 24 serves to focus the beam to a size which is small enough so that the mark produced on the edge or girdle 17 of the diamond does not significantly impair the value of the stone. The mark produced according to the invention is preferably so small that it is essentially invisible to the naked eye. The focussed beam impinges upon the surface of the diamond 15 and effects a small removal in the form of the desired mark. The low wavelength of the laser output energy enables marks of exceedingly high line resolution to be created in the described manner. Moreover, the resolution is so fine that a mark may even be created on the culet of the stone. In practical terms, surface details of one micron resolution can be achieved.

Because diamond is essentially opaque to laser radiation at about 193 nm wavelength, the laser energy is absorbed only at the outermost surface portion of the stone. The rapid absorption of energy causes the entire image to be formed with only one or a relatively few energy pulses, such as several or several tens of pulses. The required output energy (or fluence) of the excimer laser beam may range from a few to several tens or more milliJoules per square centimeter, with the precise energy output necessary for a given application depending on the size of the mark to be produced, the degree of optical reduction of the beam, and the desired depth of the mark to be created (i.e., the amount of material to be vaporized).

The diamond may be held in a single fixed position during the entire marking process and accordingly there is no need in this embodiment of the invention for a complex and expensive computer-controlled X-Y table or any other expensive or complex positioning means such as those described in U.S. Pat. Nos. 4,392,476 and 4,467,172. These prior art systems must scan the surface to be marked with individual pulses, each creating only a minute portion of the image at any given moment.

As already stated, a small amount of material may be removed by vaporization from the surface of the diamond. In addition, remaining portions of the diamond material may also be heated sufficiently to "graphitize" or undergo an allotropic transformation from one form of elemental carbon, i.e., diamond, to another, e.g., graphite. It is known that at sufficiently high temperatures, e.g., about 900° C., diamond will transform into graphite and the entire diamond crystal lattice will decompose. Before such decomposition occurs, however, it appears that the material may transform or partially transform into graphite while retaining the strength and durability of the diamond crystal lattice configuration.

It is believed that the diamond may undergo such a conversion within the crystal structure or at its surface, as it has been found that darkened or "graphitized" regions cannot be removed with conventional acid washes which would normally remove graphite from the surface of a diamond. Thus, a completely permanent mark is formed. In effect, diamond is treated as a photo-sensitive material according to the principles of the invention.

It has been observed that graphitization begins to occur at energy levels of about 20 milliJoules per square centimeter, measured at the mask and before any reduction optics. For a plot of surface damage versus beam energy density, it is known that this curve for diamond is theoretically a step function. Below a lower threshold value no damage occurs, while above an upper threshold no further damage is done, regardless of energy applied. In practice, it has been observed that there is a very narrow transition zone around 20 milliJoules per square centimeter per pulse (at the mask) in which surface damage, e.g., graphitization, can be selectively controlled by carefully and minutely adjusting the excimer laser energy output. By so controlling the laser, marks having different degrees of opacity, i.e., a "gray scale," can be produced.

Further advantageous is the fact that the laser energy at about 193 nm wavelength does not penetrate into the crystal structure. Internal heating of the crystal is thus avoided, such heating being a significant cause of diamond fracture in prior art diamond marking schemes employing laser energy. At least one prior art method included an additional step of applying a coating of an energy absorbing material such as carbon black to the surface of a diamond before carrying out any laser marking. The success of this prior technique depended at least in part on the uniformity and density of the energy absorbing coating on the diamond surface, and this dependency is entirely eliminated by the present invention.

Permanent marks on the surface of a diamond have been created according to the foregoing described embodiment of the invention. Marks in the form of the letter "Q" having dimensions 300 microns wide by 400 microns high were formed by application of from 1 to 10 pulses of an ArF excimer laser.

Figure 2:
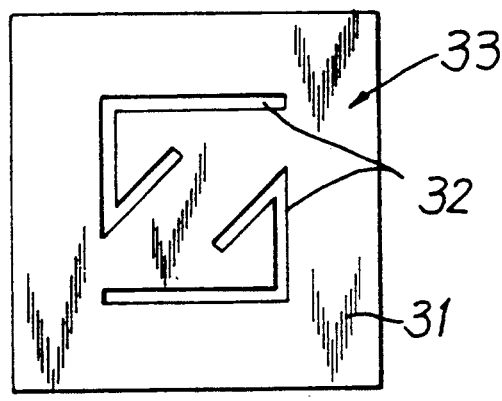
FIG. 2 is a plan view of a mask provided with a trade-mark.

FIG. 2 illustrates a mask 33 used to form a particular image on a diamond according to the invention. The mask is constructed of any suitable material 31 sufficiently strong to withstand the excimer laser energy without itself vaporizing, such as paper. The mask 33 includes cut-out areas 32 in the pattern of the desired mark.

In an alternative embodiment, the mask comprises a plate of fused quartz, fused silica or sapphire, coated with a suitably opaque and heat-resistant material, such as a photoresist. The mask may be prepared so as to have areas which are not coated with the opaque material or which are only diffusely so coated. By controlling the density of the coating on the mask as selected areas thereof, a mask having areas of different transmissivities is provided. Such a mask may advantageously be used to produce a mark having predetermined areas of differentiated contrast, i.e., different qray shades, as explained hereinabove.

Figure 3:
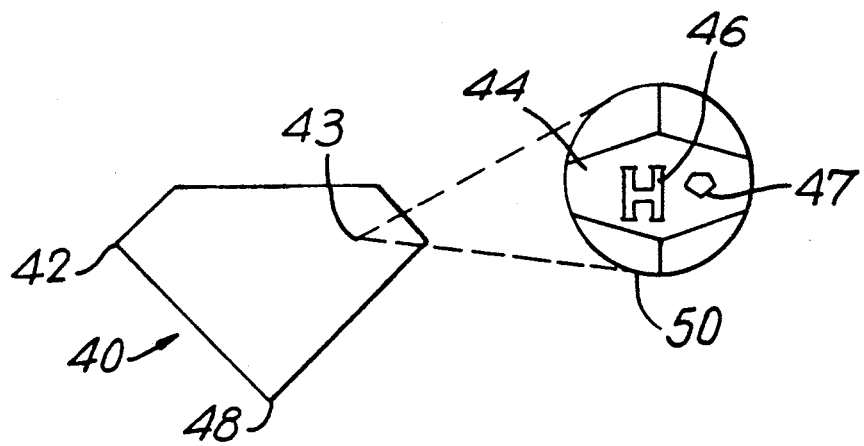
FIG. 3 is a side view of a diamond bearing an identifying mark.

FIG. 3 shows a diamond 40 having been marked at a particular circumferential location 43 on the girdle 42. The girdle 42 customarily includes numerous small facets such as the facet 44 shown in the enlarged view 50 of the gindle 42, any of which is suitable for discreetly placed markings. It will be understood that the methods of the present invention are equally well applied to polished and unpolished, i.e., rough finished, diamond surfaces alike. While markings may be created anywhere on a diamond, it is aesthetically preferable to create such markings only on minor facets of the stone. The present method may even be advantageously used to place a mark on the culet 48 of the stone 40.

As shown in FIG. 3, the laser-created indicia include a letter "H" 46 and a smaller representation of a diamond 47. As described above, these marks 46, 47 may either be of equal or differing depths and/or contrasts, even when produced at the same time by the same excimer laser pulses.

In an alternative embodiment of the invention, the same apparatus and process steps as just described are repeated, but the diamond is first coated at the location to be marked with a substance having special properties, such as fluorescence or phosphorescence. When a mark, especially a mark which is so small that it is invisible to the naked eye, is created on a diamond, it may often be difficult to subsequently find the mark in the first place. This would undermine the value of the mark as a means for additional security in instances where the diamond must be relatively quickly identified. A fluorescing mark could more easily be located and inspected, given the appropriate lighting conditions, e.g., ultraviolet, and is thus a desirable feature of a method for marking diamonds.

When the excimer laser energy impinges the coated surface of the stone, a significant number of molecules of the coating remain at the area of the mark and are adhered to or infused into the surface of the diamond, without having been vaporized. The precise machanism of this action is not understood at this time. Nonetheless, when materials such as zinc sulfide or diethyl zinc in combination with gaseous sulfur compounds are employed or deposited as coating the marks so produced according to the invention, they can be located only under lighting conditions (ultraviolet) which cause the mark to fluoresce in a preselected, extremely narrow frequency band, thus aiding in the prevention of unauthorized detection.

In addition, such deposition and/or alloy combining of metals or volatile metal compounds with diamond carbon, such as arsine, phosphine, iron or iron carbonyl, and nickel or nickel carbonyl, at the surface of the diamond can produce magnetically detectable indicia, i.e., diffused or decomposed metal and/or metal carbides catalyzed by the laser on the indicia. Such deposition of other substances such as titanium carbide or molybdenum carbide could produce other electrically detectable indicia. Similarly, diborane or any other gaseous or solid compound elements, could cause profusion of substances to create electron junctions to cause a change in electrical properties, i.e., in a manner similar to doping of silicon to produce npn and/or pnp semiconductors.

Thus a range of optical, magnetic or electrical properties could be engendered.

It may be advantageous in some circumstances to create a series of precisely spaced circumferential marks according to this alternative embodiment, wherein an electronically readable, unique "signature" may be defined for a stone. For example, the stone could be rotated at a predetermined speed and the magnetic marks electronically detected by a fixed counter or similar device. The counter output would provide a distinctive signal pattern which could be maintained as a secret by the owner of the diamond. Given the existence of sufficiently accurate measuring systems, it would be particularly difficult for a would-be thief to "forge" the correct pattern of marks on a different stone.

Such advantageous marking of diamonds is entirely novel and the range of uses for such marks is not completely exhausted by this brief description.

It is also known that diamond may be "created" by thin-film chemical-vapor-deposition (CVD) techniques. It may be advantageous in certain cases to sandwich an identification mark between the natural stone and a superficial CVD layer of diamond for added security.

It will be understood that the foregoing description is that of the preferred embodiments of the invention and that various changes and modifications may be made thereto without departing from the spirit and scope of the invention as defined in the appended claims. For example, the mask 23 in FIG. 1 is shown as being position between the laser 11 and the reduction lens 24, yet the mask 23 could also be located between the lens 24 and the diamond 15 to be marked, although the illustrated position is preferred. When the reduction lens 24 is not used, the position of the mask 23 may range from just at the output of the laser 11 to adjacent the stone 15, without any significant effect on operation.

As noted above, some diamonds may be more advantageously marked according to the invention by using KrF, XeCl or XeF lasers. Alternatively, any laser source capable of delivering sufficient energy at the appropriate wavelength would suffice.

It is further envisioned that the principles of the invention may be readily useful and advantageous to those in the extrusion arts. More specifically, extremely fine complex patterns may be used as masks in the production of diamond plate extrusion dies such as for use in extruding metal wire, glass fiber or synthetic fibers. By repetitively pulsing the excimer laser, thin diamond plates may be essentially "drilled" with the resulting hole in the form of the mask, after reduction.

This would permit creation of fabrics having new and as yet unappreciated qualities. For example, fibers having uniquely high nap could be produced and then woven into new materials having applications such as filters, substrates or insulators. Almost any cross-section could be obtained for an extruded material, at extremely high resolution of surface features.

Moreover, the die could be "drilled" in the direction of greatest strength of the diamond. Particularly strong and durable dies are thus obtainable according to the basic principles of the present invention.

What is claimed is:

1. A method of producing a marking on a diamond, the method comprising the steps:
    positioning a mask between an output of an excimer laser and a portion of a surface of the diamond to be marked; and
    directly irradiating the portion of the surface of the diamond with the excimer laser through the mask so as to permit the radiation of the excimer laser itself to create the mark in a pattern defined by the mask.

2. The method of claim 1, wherein the excimer laser irradiates the diamond with at least one energy pulse at a wavelength of about 193 nm.

3. The method of claim 1, wherein said step of irradiating includes passing the excimer laser radiation through cut-out areas in the mask.

4. The method of claim 1, wherein said step of irradiating includes passing the excimer laser radiation through areas of different transmissivities in the mask.

5. The method of claim 1, said mask being spaced away from the surface of the diamond.

6. The method of claim 1, said mask being directly on or adjacent the surface of the diamond.

7. The method of claim 1, said mask being imaged onto the surface of the diamond at a reduced size through means for optically reducing the mask pattern.

8. The method of claim 3, said mask being made of paper.

9. The method of claim 4, said mask being made of one of the group of materials which are substantially transmissive at the wavelength of the excimer wavelength radiation, the group including fused quartz, silica and sapphire.

10. The method of claim 1, wherein the energy of the excimer laser is adjusted to remove only a thin layer from the surface of the diamond.

11. The method of claim 10, wherein said layer removed from said surface has a thickness ranging from approximately several angstroms to several microns.

12. The method of claim 1, wherein the entire mark is created while holding the diamond in a single fixed position.

13. The method of claim 1, including the step, before irradiating the diamond, of applying a coating of material to the surface to be marked, which material is detectable only under predetermined lighting conditions.

14. The method of claim 13, wherein the material is a fluorescent material.

15. The method of claim 13, wherein the material is a phosphorescent material.

16. The method of claim 1, including the step, before irradiating the diamond, of applying a coating of detectable material to the surface to be marked, wherein the detectable material is optically or electrically or magnetically detectable.

17. The method of claim 16 wherein the detectable material is molybdenum carbide, nickel carbide, titanium carbide of iron carbide.

18. The method of claim 16, comprising the further step of similarly directly irradiating at least a second portion of the diamond to form at least a second mark.

19. The method of claim 1, wherein the energy of the excimer laser is adjusted to partially transform the diamond from one form of elemental carbon to another form of elemental carbon.

20. The method of claim 1, wherein the energy of the excimer laser is adjusted to partially graphitize the diamond at the portion being marked.

21. The method of claim 21, wherein the darkness of the mark so produced varies with the degree of graphitization caused by the excimer laser radiation.

* * * * *

UNITED STATES PATENT AND TRADEMARK OFFICE
CERTIFICATE OF CORRECTION

PATENT NO. : 5,149,938

DATED : September 22, 1992

INVENTOR(S) : RONALD H. WINSTON et al.

It is certified that error appears in the above-identified patent and that said Letters Patent is hereby corrected as shown below:

In claim 21, line 1, delete "claim 21" and insert therefor --claim 20--.

Signed and Sealed this

Eighth Day of March, 1994

Attest:

BRUCE LEHMAN

Attesting Officer

Commissioner of Patents and Trademarks